United States Patent
McAdam et al.

(10) Patent No.: US 9,581,993 B2
(45) Date of Patent: Feb. 28, 2017

(54) AMBIENT DISPLAY FOR INDUSTRIAL OPERATOR CONSOLES

(71) Applicant: Honeywell International Inc., Morristown, NJ (US)

(72) Inventors: Rohan McAdam, Yetholme (AU); Graeme Laycock, Hunters Hill (AU)

(73) Assignee: Honeywell International Inc., Morris Plains, NJ (US)

( * ) Notice: Subject to any disclaimer, the term of this patent is extended or adjusted under 35 U.S.C. 154(b) by 353 days.

(21) Appl. No.: 14/177,817

(22) Filed: Feb. 11, 2014

(65) Prior Publication Data

US 2015/0227135 A1    Aug. 13, 2015

(51) Int. Cl.
G05B 19/414    (2006.01)
G05B 19/409    (2006.01)
G05B 15/00     (2006.01)

(52) U.S. Cl.
CPC ......... *G05B 19/414* (2013.01); *G05B 19/409* (2013.01); *G05B 2219/23135* (2013.01); *G05B 2219/31455* (2013.01); *G05B 2219/35312* (2013.01)

(58) Field of Classification Search
None
See application file for complete search history.

(56) References Cited

U.S. PATENT DOCUMENTS

| | | | |
|---|---|---|---|
| 6,611,203 B2 | 8/2003 | Whitmore et al. | |
| 9,244,452 B2 * | 1/2016 | Brandes | G05B 19/0426 |
| 2002/0063636 A1 | 5/2002 | Whitmore et al. | |
| 2009/0292580 A1 * | 11/2009 | Cross | G06Q 10/06312 |
| | | | 705/7.22 |

FOREIGN PATENT DOCUMENTS

| | | |
|---|---|---|
| EP | 1379082 A1 | 1/2004 |
| JP | 05-266383 A | 10/1993 |
| JP | 2000288274 A | 10/2000 |
| JP | 03175078 B2 | 6/2001 |

(Continued)

OTHER PUBLICATIONS

International Search Report dated Apr. 24, 2015 in connection with International Application No. PCT/US2015/013511; 3 pages.

(Continued)

*Primary Examiner* — Eric C Wai

(57) ABSTRACT

A system includes at least one graphical display configured to display information associated with an industrial process and with a control system associated with the industrial process. The system also includes at least one processing device configured to identify a current state of the industrial process or the control system. The system further includes an ambient display configured to generate ambient lighting having one or more characteristics based on the current state. The one or more characteristics could include a color, an intensity, and/or a speed of transitions in the ambient lighting. The color could be based on whether the industrial process is operating normally and whether the control system has generated any warnings or alarms associated with the industrial process. The ambient display can be configured to transition the ambient lighting from a first color to a second color based on a change in the current state.

21 Claims, 3 Drawing Sheets

(56) References Cited

FOREIGN PATENT DOCUMENTS

| KR | 10-1327255 B1 | 11/2013 |
|----|---------------|---------|
| WO | WO 2004/006570 A1 | 1/2004 |
| WO | WO 2004/006578 A2 | 1/2004 |
| WO | WO 2005/069640 A1 | 7/2005 |
| WO | WO 2006/003600 A1 | 1/2006 |
| WO | WO 2006/003603 A1 | 1/2006 |
| WO | WO 2006/003604 A1 | 1/2006 |
| WO | WO 2006/003624 A1 | 1/2006 |

OTHER PUBLICATIONS

Written Opinion of the International Searching Authority dated Apr. 24, 2015 in connection with International Application No. PCT/US2015/013511; 8 pages.

"Ambient Device"; printed from en.wikipedia.org/wiki/Ambient_device; May 2013; 2 pages.

"Ambilight"; printed from en.wikipedia.org/wiki/Ambilight; Jun. 2013; 4 pages.

"Ambient Products"; printed from www.ambientdevices.com/about/energy-devices; Jan. 9, 2014; 3 pages.

\* cited by examiner

AMBIENT DISPLAY FOR INDUSTRIAL OPERATOR CONSOLES

TECHNICAL FIELD

This disclosure relates generally to industrial control and automation systems. More specifically, this disclosure relates to an ambient display for industrial operator consoles.

BACKGROUND

Industrial process control and automation systems are often used to automate large and complex industrial processes. These types of control and automation systems routinely include sensors, actuators, and controllers. The controllers typically receive measurements from the sensors and generate control signals for the actuators.

These types of control and automation systems also typically include numerous operator consoles. Operator consoles are often used to receive inputs from operators, such as setpoints for process variables in an industrial process being controlled. Operator consoles are also often used to provide outputs to operators, such as to display warnings, alarms, or other information associated with the industrial process being controlled. Large collections of operator consoles are often used in control rooms where a number of operators assemble and work.

SUMMARY

This disclosure provides an ambient display for industrial operator consoles.

In a first embodiment, a system includes at least one graphical display configured to display information associated with an industrial process and with a control system associated with the industrial process. The system also includes at least one processing device configured to identify a current state of the industrial process or the control system. The system further includes an ambient display configured to generate ambient lighting having one or more characteristics based on the current state.

In a second embodiment, an apparatus includes at least one processing device configured to identify a current state of an industrial process or a control system associated with the industrial process. The at least one processing device is also configured to present information associated with the industrial process and with the control system to an operator via at least one graphical display. The apparatus also includes at least one light source controller configured to control one or more light sources associated with an ambient display. The at least one light source controller is configured to control the one or more light sources so that the ambient display generates ambient lighting having one or more characteristics based on the current state.

In a third embodiment, a method includes displaying information associated with an industrial process and with a control system associated with the industrial process using at least one graphical display. The method also includes identifying a current state of the industrial process or the control system. The method further includes generating ambient lighting having one or more characteristics based on the current state using an ambient display.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
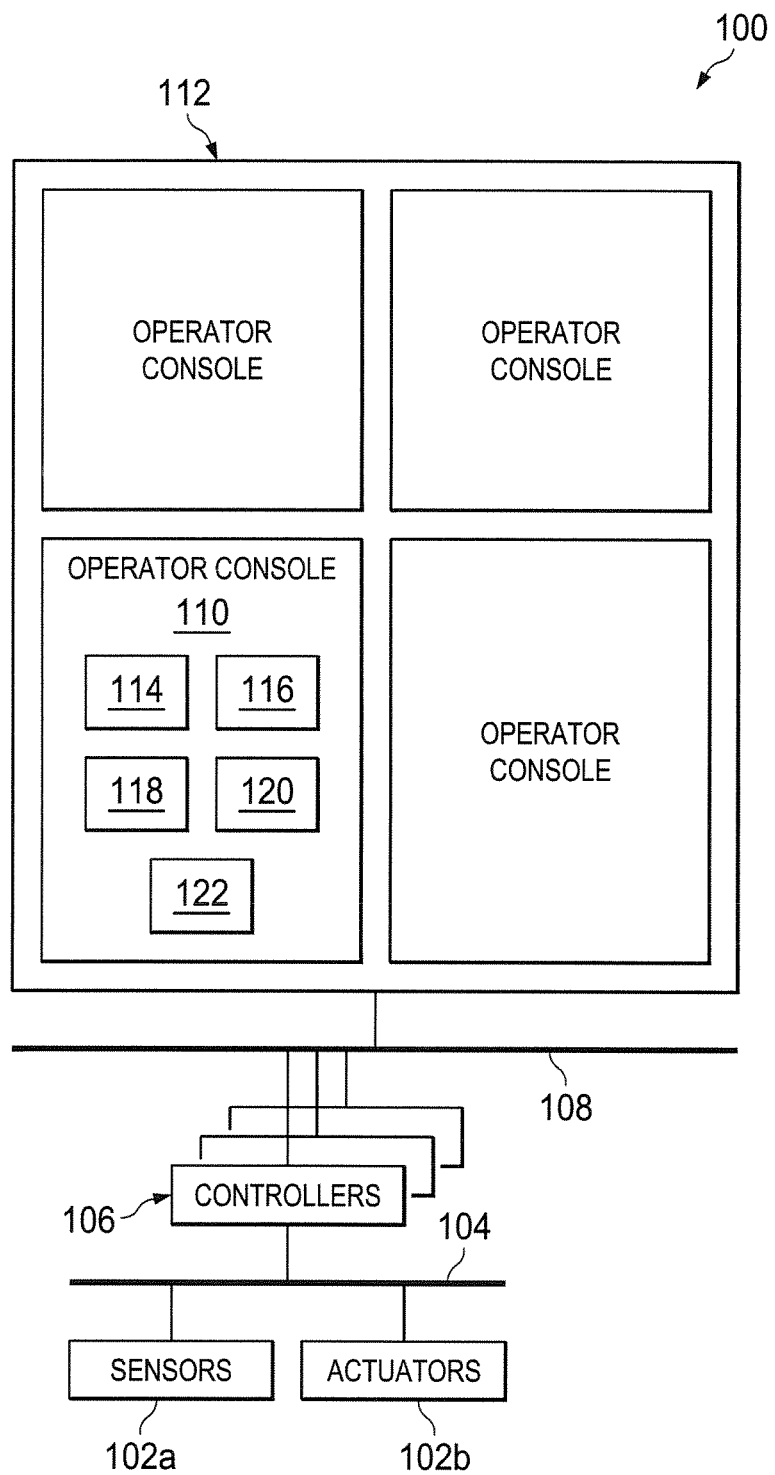
FIG. 1 illustrates an example industrial control and automation system according to this disclosure.

FIG. 1 illustrates an example industrial control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing, facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART or FOUNDATION FIELDBUS network), pneumatic control signal network, or any other or additional type(s) of network(s).

Various controllers 106 are coupled directly or indirectly to the network 104. The controllers 106 can be used in the system 100 to perform various functions. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent multivariable controllers, such as Robust Multivariable Predictive Control Technology (RMPCT) controllers or other type of controllers implementing model predictive control (MPC) or other advanced predictive control (APC).

Access to and interaction with the controllers 106 and other components of the system 100 can occur via various operator consoles 110. As described above, each operator console 110 could be used to provide information to an operator and receive information from an operator. For example, each operator console 110 could provide information identifying a current state of an industrial process to the operator, including warnings, alarms, or other states associated with the industrial process. Each operator console 110 could also receive information affecting how the industrial process is controlled, such as by receiving setpoints for process variables controlled by the controllers 106 or by receiving other information that alters or affects how the controllers 106 control the industrial process.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

Each operator console 110 includes any suitable structure for displaying information to and interacting with an operator. For example, each operator console 110 could include one or more processing devices 114, such as one or more microprocessors, microcontrollers, digital signal processors, application specific integrated circuits, field programmable gate arrays, or discrete logic. Each operator console 110 could also include one or more memories 116 storing instructions and data used, generated, or collected by the processing device(s) 114. Each operator console 110 could further include one or more network interfaces 118 that facilitate communication over at least one wired or wireless network, such as one or more Ethernet interfaces or wireless transceivers.

Operator consoles 110 are often the primary mechanism by which operators acquire and maintain situational awareness of an industrial process' status. This is typically achieved using a graphical display that shows current process information and current process states. Ideally, situational awareness is maintained even when an operator steps away from an operator console 110 and moves to another part of a control room 112, which operators often do in order to take breaks or collaborate with one another. As a result, operators often need a way of recognizing process conditions and process states on their consoles 110 even at a distance.

Conventional solutions to this problem often involve the use of audible annunciations or visible indications via flashing lights associated with operator consoles. However, audible annunciations add to the noise level in a control room, and it can be difficult for operators to distinguish which console is the source of an audible annunciation in a control room with many consoles. Flashing lights provide a clear indication of a process state, but they add to the visual clutter of a control room. They can also be quite distracting to others in a control room and contribute to a "Christmas tree" effect in a control room full of bright flashing lights.

In accordance with this disclosure, an operator console 110 includes a graphical display 120 used to support interactions with an operator. The operator console 110 also includes an ambient display 122. The ambient display 122 allows one or more operators to access information "at a glance" and without diverting attention from other tasks. This can be accomplished even when an operator is a distance from the operator console 110. The ambient display 122 utilizes the brain's pre-attentive processing capabilities to perceive information, thereby only partially utilizing the visual and cognitive attention of an operator.

In some embodiments, the ambient display 122 operates as follows. The ambient display 122 of an operator console 110 outputs a particular color of light based on the current status of information being monitored or controlled by that operator console 110. The current status could represent, for instance, the current warning, alarm, or other state(s) of process variables being monitored or controlled by the operator console 110. The color that is output changes subtly as the current status changes, such as by slowly transitioning from one color to another color or from one intensity to another intensity (rather than flashing rapidly). The ambient display 122 can be an integrated component of the console 110 and emit light that is clearly visible from a distance but not distracting for others in the control room 112. This can be achieved by the use of muted colors and smooth transitions between colors as process states change.

The use of ambient displays 122 in operator consoles 110 can have various advantages depending on the implementation. For example, ambient displays 122 allow operators to quickly and easily identify the statuses of their operator consoles 110 even at a distance and with very little cognitive processing. Also, the use of ambient displays 122 can help to avoid the necessity of using loud audible annunciations, which can be distracting in a crowded control room 110. In addition, the use of muted colors and subtle color transitions helps to avoid the "Christmas tree" effect that occurs when multiple bright lights are rapidly flashing in a control room 110.

Additional details regarding the use of ambient displays 122 with operator consoles 110 are provided below. Each graphical display 120 includes any suitable structure supporting the display of information. Each ambient display 122 includes any suitable structure supporting the use of ambient lighting.

Although FIG. 1 illustrates one example of an industrial control and automation system 100, various changes may be made to FIG. 1. For example, industrial control and automation systems come in a wide variety of configurations. The system 100 shown in FIG. 1 is meant to illustrate one example operational environment in which ambient displays can be incorporated into or used with operator consoles.

FIG. 1 does not limit this disclosure to any particular configuration or operational environment.

Figure 2:
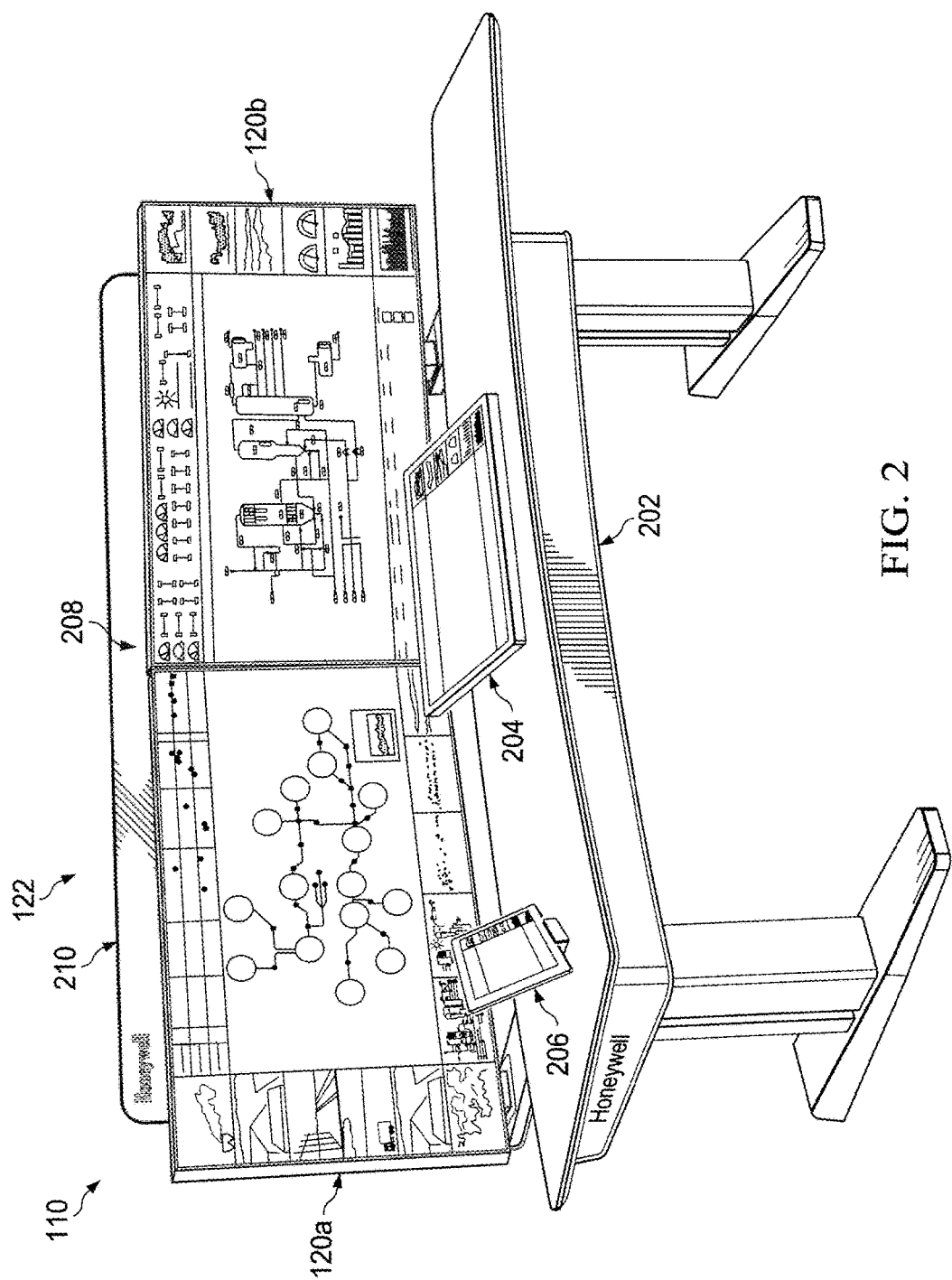
FIGS. 2 and 3 illustrate an example operator console with an ambient display according to this disclosure.
Figure 3:
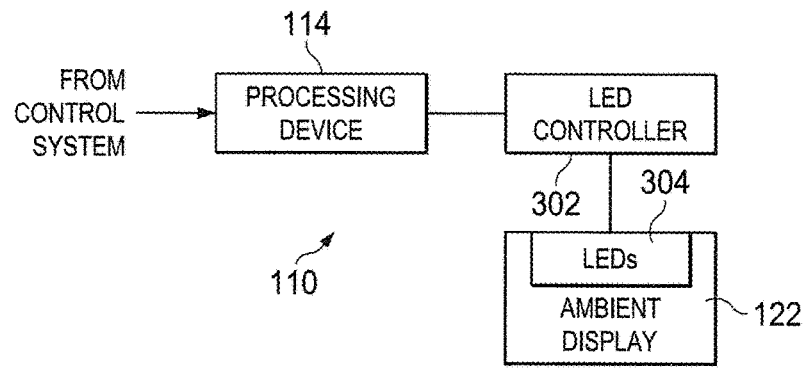

FIGS. 2 and 3 illustrate an example operator console 110 with an ambient display 122 according, to this disclosure. As shown in FIG. 2, the operator console 110 is positioned on a desk 202. The desk 202 supports components of the operator console 110 and could be used to hold or retain electronics under the operator console 110.

The operator console 110 includes one or more graphical displays 120a-120b placed on, mounted to, or otherwise associated with the desk 202. The graphical displays 120a-120b can be used to present various information to an operator. For instance, the graphical displays 120a-120b could be used to display a graphical user interface (GUI) that includes diagrams of an industrial process being controlled and information associated with the current state of the industrial process being controlled. The GUI could also be used to receive information from an operator. Each graphical display 120a-120b includes any suitable display device, such as a liquid crystal display (LCD) or light emitting diode (LED) display. In this example, there are two graphical displays 120a-120b adjacent to and angled with respect to one another. However, an operator console 110 could include any number of graphical displays in any suitable arrangement.

The operator console 110 in this example also includes an additional display 204 and a mobile device 206. The additional display 204 here is placed on the desk 202 and can be positioned at an angle. The additional display 204 could represent a touchscreen that can be used to interact with the GUI in the graphical displays 120a-120b and to control the content on the graphical displays 120a-120b. The additional display 204 could also display additional information not presented on the graphical displays 120a-120b. The additional display 204 includes any suitable display device, such as an LCD or LED display or touchscreen. Note, however, that the use of the additional display 204 is optional and that other input devices (such as a keyboard) could be used.

The mobile device 206 can similarly be used to support interactions between an operator and GUIs presented in the displays 120a-120b, 204. For example, the mobile device 206 could include a touchscreen that can be used to control the content on the displays 120a-120b, 204 and to interact with the GUIs presented in the displays 120a-120b, 204. Moreover, the mobile device 206 could receive and display information to an operator, such as current process variable values or process states, when the operator moves away from the operator console 110. The mobile device 206 includes any suitable device that is mobile and that supports interaction with an operator console, such as a tablet computer. Note, however, that the use of the mobile device 206 is optional.

The ambient display 122 here is positioned at the top of the graphical displays 120a-120b. As noted above, the ambient display 122 can output light having different characteristic(s) to identify the current status of an industrial process (or portion thereof) being monitored or controlled using the operator console 110. For example, the ambient display 122 could output green light or no light when the current status of an industrial process or portion thereof is normal. The ambient display 122 could output yellow light when the current status of an industrial process or portion thereof indicates that a warning has been issued. The ambient display 122 could output red light when the current status of an industrial process or portion thereof indicates that an alarm has been issued. However, the green, yellow, and red colors can be muted and can transition from one color to another more subtly than conventional bright flashing lights.

Moreover, the intensity of the light from the ambient display 122 can be varied based on the current status of an industrial process (or portion thereof) being monitored or controlled using the operator console 110. For example, the severity of a warning or alarm could be used to adjust the intensity of yellow or red light being output by the ambient display 122, with a higher severity associated with a higher intensity. As another example, the number of warnings or alarms could be used to adjust the intensity of yellow or red light being output by the ambient display 122, with a larger number associated with a higher intensity.

If desired, the ambient display 122 could output light that varies between colors or that varies between a color and no color. However, unlike conventional lights that flash rapidly between on and off states, the light from the ambient display 122 could transition more slowly. For example, light of a first color could slowly decrease in intensity and light of a second color could slowly increase in intensity (either serially or in an overlapping manner), and the opposite transition could then occur to switch from the second color to the first color. As another example, light of one color could pulse on and off slowly or pulse between different intensities. In general, any suitable transitions involving one or more colors could be supported by the ambient display 122.

The ambient display 122 here represents an edge-lit glass segment or other clear segment 208, where one or more edges 210 of the segment 208 can be illuminated using one or more colors of light. In this example, the segment 208 is illuminated on three sides 210, plus a vendor name within the segment 208 can be illuminated. Note, however, that the segment 208 could include multiple tracks, such as an outer edge and one or more inner edges formed internally within the segment 210, that could be illuminated (such as with different colors). Also note that the use of a vendor name is optional and that other words or phrases (or no words or phrases) could be illuminated.

In this example, the segment 208 is mounted on or to the graphical displays 120a-120b. However, the segment 208 could be mounted on any number of graphical displays. Also, the segment 208 could be mounted to the desk 202 or other structure(s) and need not be mounted on the graphical display(s). In addition, while the ambient display 122 is positioned above the graphical displays 120a-120b, the ambient display 122 could have any other suitable location. In general, the ambient display 122 can be placed in any suitable position so that light is generated at or proximate to the operator console 110, meaning there is a clear association between the light being generated and the operator console 110 associated with the light.

As shown in FIG. 3, the operator console 110 includes the at least one processing device 114, which can receive warnings, alarms, or other information from a control system. The processing device 114 could, among other things, execute an algorithm that maps warning or alarm states to one or more characteristics of light to be output by the ambient display 122. The one or more characteristics of light could include the color of light, the intensity of light, the speed of transitions in the color or intensity of light, and so on.

The processing device 114 generates output signals based on the one or more characteristics of light to be output by the ambient display 122. Those signals are provided to at least one LED controller 302, which generates drive signals for driving one or more LEDs 304 in or associated with the ambient display 122. The LED controller 302 can use any suitable technique for controlling the operation of one or more LEDs 304. For example, the LED controller 302 could generate pulse width modulation (PWM) signals for driving the LEDs 304. The LED controller 302 could also support a digital multiplexing (DMX) protocol or other protocol for driving the LEDs 304. The LED controller 302 includes any suitable structure for driving one or more LEDs.

The LEDs 304 represent structures that generate light based on signals from the LED controller 302. The LEDs 304 can generate any number of colors of light. For example, the LEDs 304 could include a red/green/blue (RGB) LED strip. The LED strip could be hidden from view when the operator console 110 is viewed from the side so that only light exiting the LED strip is visible to an operator. The LEDs 304 also include any suitable number(s) and type(s) of LEDs. Note, however, that the use of LEDs is optional and that other or additional light sources could be used with the operator console 110.

Although FIGS. 2 and 3 illustrate one example of an operator console 110 with an ambient display 122, various changes may be made to FIGS. 2 and 3. For example, the form of the operator console 110 shown in FIG. 2 is for illustration only. Operator consoles, like most computing devices, can come in a wide variety of configurations, and FIG. 2 does not limit this disclosure to any particular configuration of operator console. Also, various components in FIG. 3 could be combined, further subdivided, or omitted and additional components could be added according to particular needs. For instance, the controller 302 could be integrated into the processing device 114.

Figure 4:
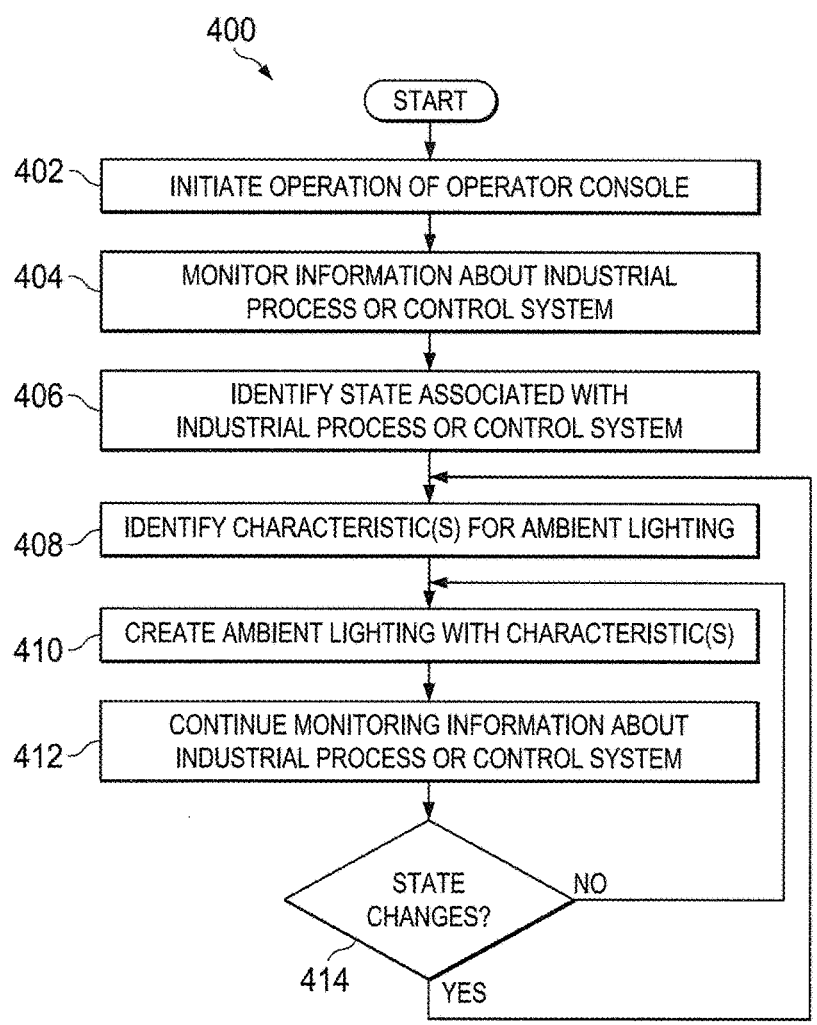
FIG. 4 illustrates an example method for using an operator console with an ambient display according to this disclosure.

FIG. 4 illustrates an example method 400 for using an operator console with an ambient display according to this disclosure. For ease of explanation, the method 400 is described with respect to the operator console 110 having the ambient display 122 shown in FIGS. 2 and 3. However, the method 400 could be used with any other suitable operator console.

As shown in FIG. 4, operation of an operator console is initiated at step 402. This could include, for example, the processing device 114 of the operator console 110 booting up and performing various initial actions, such as establishing communications with an external control system. The operator console monitors information associated with the control system or an industrial process at step 404. This could include, for example, the processing device 114 of the operator console 110 monitoring the control system to identify any warnings or alarms generated by the control system. The warnings or alarms could be associated with process variables or other features of an industrial process that are currently being monitored or controlled by the operator console 110.

A current state of the industrial process or control system is identified at step 406. This could include, for example, the processing device 114 of the operator console 110 determining whether the industrial process is operating normally within specified parameters or if any warnings or alarms are currently being generated.

One or more characteristics of ambient lighting are identified based on the current state of the industrial process or control system at step 408. This could include, for example, the processing device 114 of the operator console 110 determining the color and intensity of light to be generated by the ambient display 122 based on the current state of the industrial process or control system. As a particular example, the color of light could vary based on whether the industrial process is operating normally or the control system has generated any associated warnings or alarms. The color or intensity of light could also vary based on how close the industrial process or control system is from transitioning from one state to another, such as from the warning state to an alarm state. As another particular example, the characteristics of the ambient lighting could define how one or more colors pulse or switch back and forth depending on the current state of the industrial process or control system.

Ambient lighting with the identified characteristic(s) is generated at step 410. This could include, for example, the processing device 114 instructing the LED controller 302 how to drive one or more LEDs 304 in the ambient display 122.

The operator console continues to monitor information associated with the control system or industrial process at step 412 and identifies whether the current state of the control system or industrial process changes at step 414. If not, the operator console can return to step 410 and continue generating ambient light with the same characteristic(s). If so, the operator console can return to step 408 and identify whether ambient lighting with one or more different characteristics (such as a different color, intensity, or pattern) should be generated.

In this way, the operator console can easily generate and output light that informs an operator of the current state of an industrial process or control system. The light can be seen at a distance, which allows an operator to identify the current state at a glance. The light can also be generated in a manner that is less distracting to other operators.

Although FIG. 4 illustrates one example of a method 400 for using an operator console with an ambient display, various changes may be made to FIG. 4. For example, while shown as a series of steps, various steps in FIG. 4 could overlap, occur in parallel, occur in a different order, or occur any number of times.

In some embodiments, various functions described above (such as controlling ambient displays based on current alarm status) are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   at least one graphical display configured to display information associated with an industrial process and with a control system associated with the industrial process;
   at least one processing device configured to identify a current state of the industrial process or the control system and to map the current state of the industrial process or the control system to one or more characteristics of ambient lighting; and
   an ambient display configured to generate the ambient lighting having the one or more characteristics based on the current state, the ambient display comprising an edge-lit segment and one or more light sources, the one or more light sources configured to generate light that illuminates one or more edges of the edge-lit segment.

2. The system of claim 1, wherein the one or more characteristics comprise a color of the ambient lighting, the color based on whether the industrial process is operating normally and whether the control system has generated any warnings or alarms associated with the industrial process.

3. The system of claim 2, wherein the ambient display is configured to transition the ambient lighting from a first color to a second color based on a change in the current state by reducing an intensity of the ambient lighting with the first color and increasing an intensity of the ambient lighting with the second color.

4. The system of claim 1, wherein the one or more characteristics comprise at least one of: a color of the ambient lighting, an intensity of the ambient lighting, and a speed of transitions in the ambient lighting.

5. The system of Claim 1, wherein the edge-lit segment is positioned over the at least one graphical display.

6. The system of Claim 1, wherein:
   the edge-lit segment comprises a glass segment; and
   the one or more light sources comprise one or more light emitting diodes.

7. The system of Claim 1, further comprising:
   at least one controller configured to drive the one or more light sources based on signals output from the at least one processing device;
   wherein the at least one processing device is further configured to generate the signals based on the one or more characteristics of the ambient lighting.

8. The system of claim 1, wherein the one or more characteristics comprise a speed of transitions in the ambient lighting.

9. An apparatus comprising:
   at least one processing device configured to:
      identify a current state of an industrial process or a control system associated with the industrial process;
      map the current state to one or more characteristics of ambient lighting; and
      present information associated with the industrial process and with the control system to an operator via at least one graphical display; and
   at least one light source controller configured to control one or more light sources associated with an ambient display comprising an edge-lit segment, the at least one light source controller configured to control the one or more light sources so that the ambient display generates the ambient lighting having the one or more characteristics based on the current state of the industrial process or the control system, the one or more light sources configured to generate light that illuminates one or more edges of the edge-lit segment.

10. The apparatus of claim 9, wherein the one or more characteristics comprise a color of the ambient lighting, the color based on whether the industrial process is operating normally and whether the control system has generated any warnings or alarms associated with the industrial process.

11. The apparatus of claim 10, wherein the at least one light source controller is configured to transition the ambient lighting from a first color to a second color based on a change in the current state by reducing an intensity of the ambient lighting with the first color and increasing an intensity of the ambient lighting with the second color.

12. The apparatus of claim 9, wherein the one or more characteristics comprise at least one of: a color of the ambient lighting, an intensity of the ambient lighting, and a speed of transitions in the ambient lighting.

13. The apparatus of claim 9, wherein the at least one light source controller is configured to control one or more light emitting diodes that are part of the one or more light sources.

14. The apparatus of claim 9, wherein the at least one light source controller is integrated into the at least one processing device.

15. The apparatus of claim 9, wherein the edge-lit segment is positioned over the at least one graphical display.

16. A method comprising:
   displaying information associated with an industrial process and with a control system associated with the industrial process using at least one graphical display;
   identifying a current state of the industrial process or the control system;
   mapping the current state to one or more characteristics of ambient lighting; and
   generating the ambient lighting having the one or more characteristics based on the current state of the industrial process or the control system using an ambient display, the ambient display comprising an edge-lit segment and one or more light sources, the one or more light sources generating light that illuminates one or more edges of the edge-lit segment.

17. The method of claim 16, wherein the one or more characteristics comprise a color of the ambient lighting, the color based on whether the industrial process is operating normally and whether the control system has generated any warnings or alarms associated with the industrial process.

18. The method of claim 17, further comprising:
   transitioning the ambient lighting from a first color to a second color based on a change in the current state by reducing an intensity of the ambient lighting with the first color and increasing an intensity of the ambient lighting with the second color.

19. The method of claim 16, wherein the one or more characteristics comprise at least one of: a color of the ambient lighting, an intensity of the ambient lighting, and a speed of transitions in the ambient lighting.

20. The method of Claim 16, wherein the edge-lit segment is positioned over the at least one graphical display.

21. The method of claim 16, wherein the one or more light sources comprise one or more light emitting diodes.

* * * * *